Oct. 7, 1947.                    A. C. LIND                   2,428,756
       SEDIMENTATION CHAMBER FOR SEPARATING SOLIDS FROM LIQUIDS
                    HAVING FLOW DISTRIBUTING MEANS THEREIN
                         Filed April 14, 1944        3 Sheets-Sheet 3
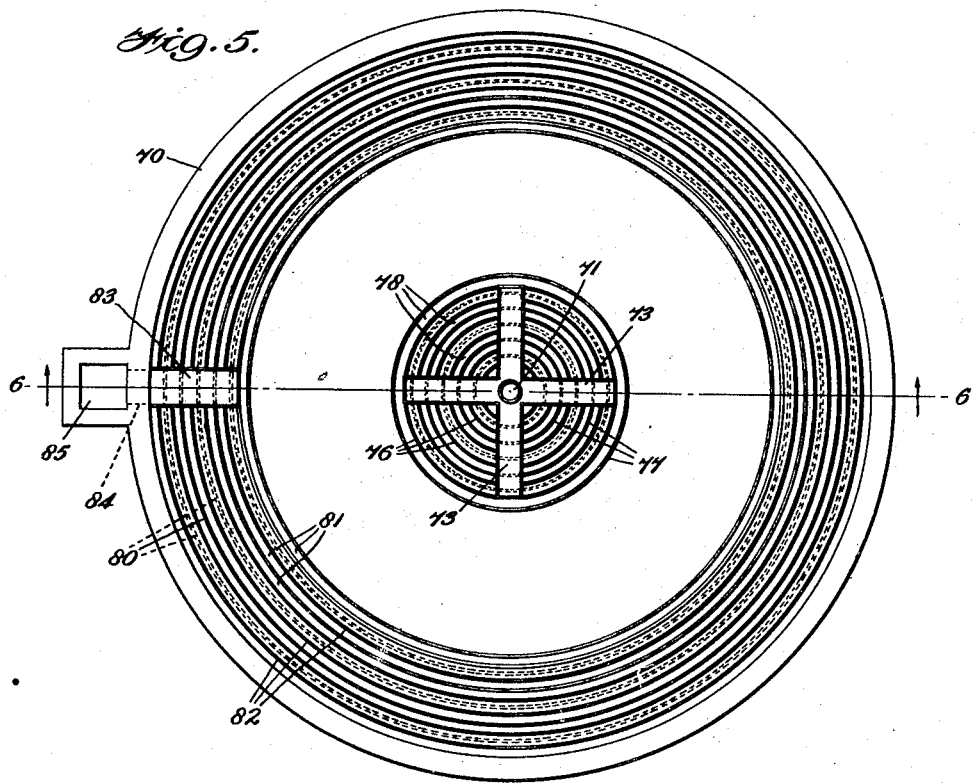
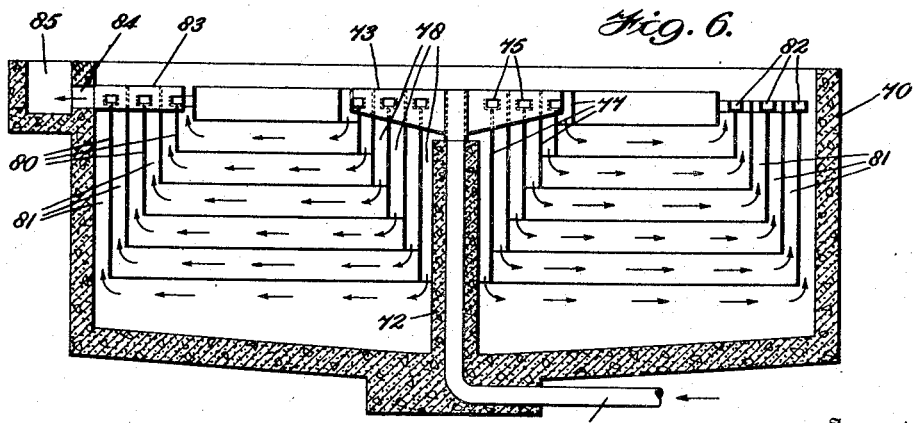
Inventor
Arthur C. Lind, Patented Oct. 7, 1947

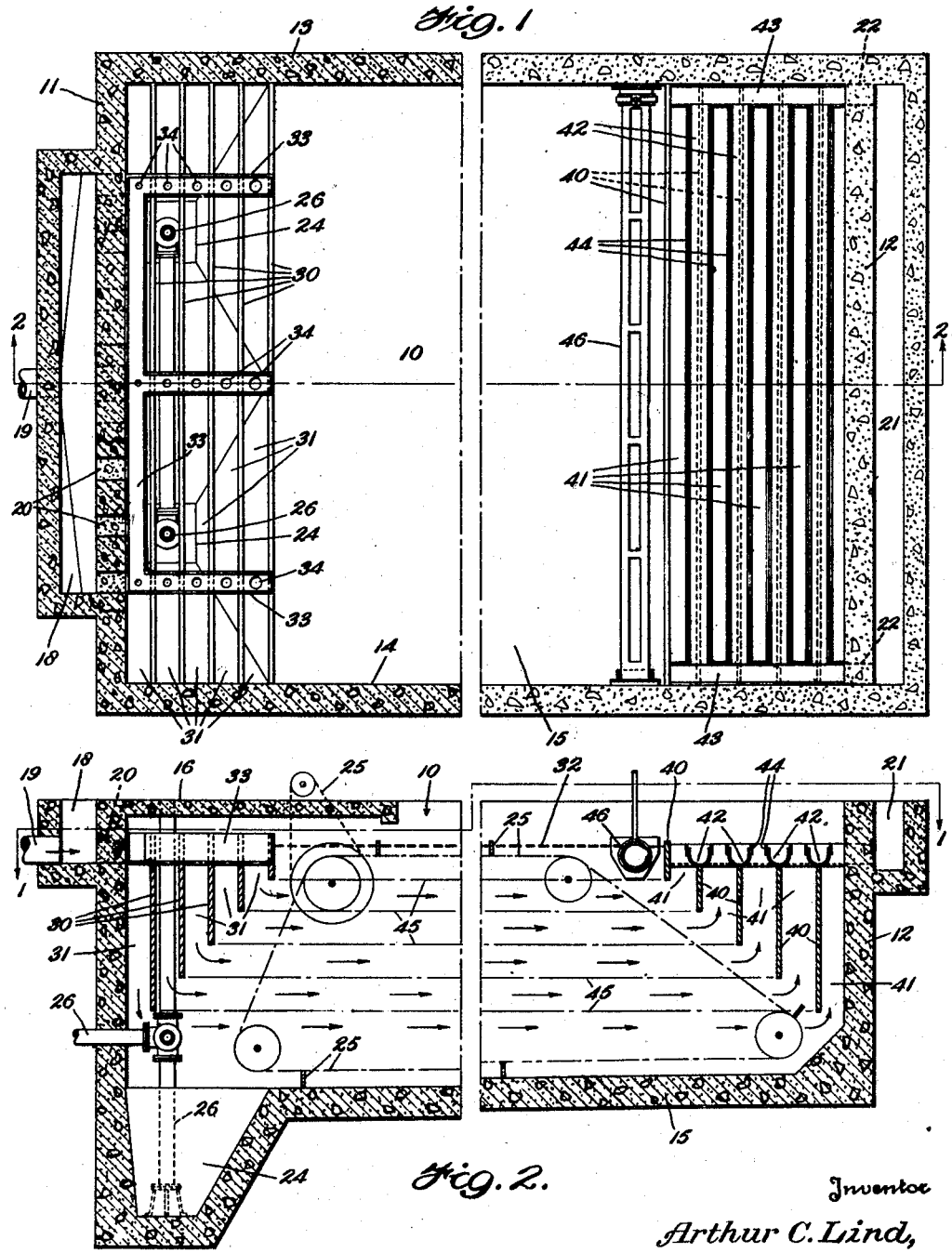

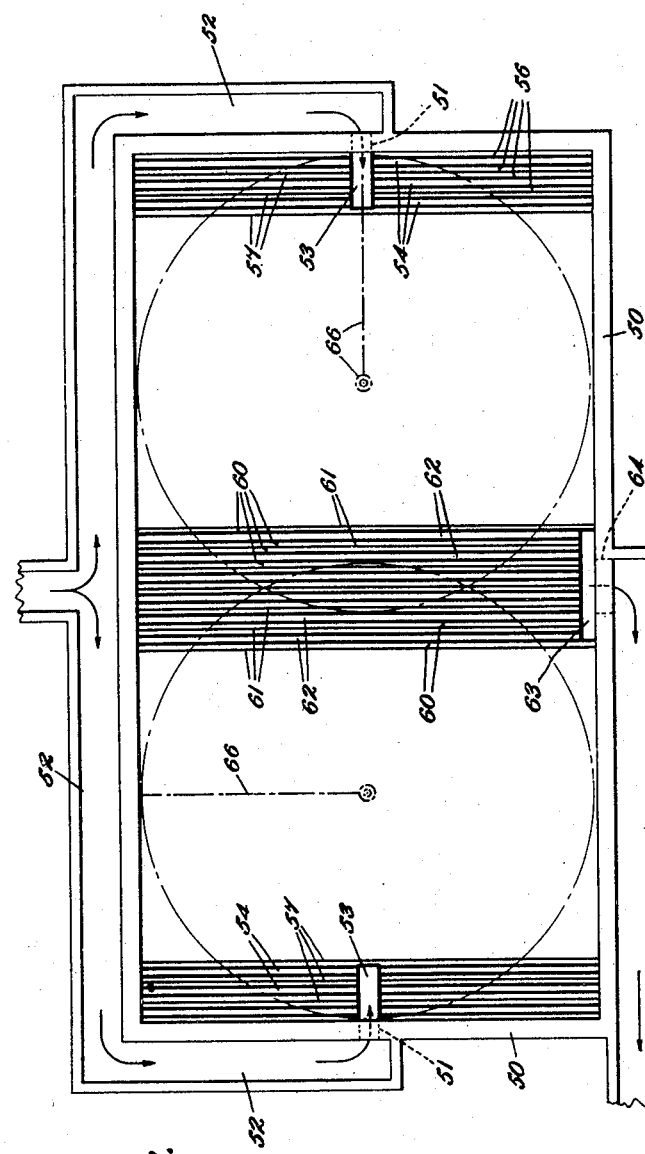

2,428,756

UNITED STATES PATENT OFFICE 2,428,756

SEDIMENTATION CHAMBER FOR SEPARATING SOLIDS FROM LIQUIDS HAVING FLOW DISTRIBUTING MEANS THEREIN

Arthur C. Lind, Milwaukee, Wis., assignor to Chain Belt Company, Milwaukee, Wis., a corporation of Wisconsin Application April 14, 1944, Serial No. 531,051

5 Claims. (Cl. 210—3)

1

The invention relates to sedimentation apparatus, such as is widely used in water purification, sewage disposal, and similar work, and has for its principal object to improve the efficiency of such apparatus.

In sedimentation work of the character mentioned wherein the object in view is the separation of solids from a liquid in which they are suspended, it is customary to introduce the solids-carrying liquid into settling chambers of a size dependent upon the volume to be handled and which will permit it to be retained therein in a relatively quiescent state for a period of time sufficient to enable at least a high percentage of the suspended solids to settle to the bottom of the chamber. From there the solids are continuously or intermittently removed by appropriate mechanism, while the relatively clear liquid flows continuously from the top of the chamber. In some types of apparatus the chambers are in the form of long and relatively narrow rectangles, while in other types the chambers are of square or circular shape. In some instances the influent liquid is introduced into the chamber adjacent its top, at either an end or side thereof, with the effluent being discharged from the top of the opposite end or side; in other cases, more especially in the circular form, the liquid is introduced at the axis of the chamber (sometimes at the top and sometimes adjacent the bottom) and the flow is radially outward to the perimeter, from which the effluent is discharged.

In many of the forms of apparatus heretofore employed the construction has been such as to fail to effectively utilize all portions of the settling chambers, with the result that portions of the liquid may be detained indefinitely while other portions pass through more rapidly than is permissible for satisfactory separation of their carried solids.

It is an object of the present invention to correct such a condition and to provide a simple and relatively inexpensive construction whereby substantially all portions of the chamber will be effectively utilized for their intended purpose and in which the detention period of all portions of the liquid will be more nearly uniform. While for purposes of disclosure the invention has been illustrated and will be described as applied to sedimentation chambers of three well known types, it will be readily apparent to those skilled in the art that its principles are easily applicable to various other types.

In the accompanying drawing forming a part

2 of this specification, in which like reference characters designate like parts throughout the views:

Figure 1 is a sectional-plan view of a typical rectangular sedimentation chamber of the type in which the feed is at the top of one end and the discharge is from the top of the other end, in which chamber apparatus in accordance with one form of the invention has been incorporated, the said view being taken approximately on the planes indicated by the line 1—1 of Fig. 2;

Fig. 2 is a longitudinal vertical sectional view, taken approximately on the plane indicated by the line 2—2 of Fig. 1, looking in the direction of the arrows;

Fig. 3 is a plan view, partly diagrammatic, illustrating the application of the invention to a rectangular chamber in which the feed is at the top of both ends, with the effluent being discharged at the medial top portion of a side of the chamber;

Fig. 4 is a central longitudinal sectional view of the apparatus shown in Fig. 3;

Fig. 5 is a plan view illustrating an application of the invention to a circular chamber; and Fig. 6 is a vertical sectional view on approximately the plane indicated by the line 6—6 of Fig. 5, looking in the direction of the arrows.

Referring more particularly to Figs. 1 and 2, 10 indicates a settling chamber of appropriate dimensions to handle the expected volume of liquid in accordance with recognized practice, said chamber having end walls 11 and 12, side walls 13 and 14, a bottom 15 and a partial cover 16. The end wall 11 is provided adjacent its top with an influent launder 18 to which the solids-carrying liquid is supplied by a conduit 19, and which communicates with the chamber 10 through a plurality of ports 20 extending through the wall 11. In similar manner the end wall 12 is provided with an effluent launder 21 adapted to receive liquid from the chamber 10 through ports 22 provided in the said wall 12. The bottom 15 may be provided with a sump 24 into which the settled solids may be moved by a sludge conveyer (conventionally indicated at 25, Fig. 2) for removal through pipes 26 in a well known manner.

In previous apparatus of this character there has been a tendency for liquid in the lower corner portions at each end of the chamber to stagnate, or at least to move less rapidly than the liquid above and/or in the portions intermediate the ends 11 and 12. This has resulted in short circuiting of the liquid between the inlet and outlet, and a flow thereof which is too rapid for even reasonably complete settling of the suspended solids. To overcome this objection, the present invention provides a series of baffles 30 adjacent the influent end 11, extending transversely of the chamber between the side walls 13 and 14, and spaced from one another in a direction longitudinally of the chamber to provide a plurality of adjacent liquid-conducting channels 31. As will be clear from Fig. 2, the baffles 30 extend downwardly to depths which decrease progressively away from the end wall 11, whereby the channels 31 terminate at progressively decreasing distances below the normal liquid level, indicated by the line 32. A trough or launder 33 is mounted above the baffles 30 in position to receive the mixed liquid and solids from the inlet ports 20 and distribute the same to the several channels 31 through apertures 34, the size of which preferably increases progressively in a direction away from the wall 11, as clearly shown in Fig. 1, whereby to compensate for loss of head and more or less equalize the flow to the several channels.

At the effluent end of the chamber a second series of longitudinally spaced baffles 40 extends transversely from wall to wall, which baffles project downwardly to depths which increase progressively toward the end wall 12 to provide adjacent liquid-conducting channels 41 terminating at progressively increasing distances below the liquid level 32. A series of spaced transverse troughs 42 is disposed above the baffles 40, which troughs communicate at their ends with longitudinal troughs 43 arranged to discharge through the ports 22 to the launder 21. The troughs 42 are preferably provided with adjustable weirs 44 whereby the level 32 of the liquid may be varied, and the flow through the chamber may be carefully controlled.

As will be understood from Fig. 2, the incoming liquid-solids mixture which enters the chamber 10 through the channel 31 adjacent the wall 11 is discharged from the said channel in proximity to the bottom of the chamber and is prevented from moving horizontally until it reaches the bottom of the first baffle 30. Owing to the decreasing depth of the succeeding baffles the mixture entering through the succeeding channels 31 may spread horizontally toward the effluent at progressively decreasing depths. In similar manner, the liquid will enter the channels 41 at the effluent end of the chamber at depths which increase progressively toward the wall 12, and there will thus be created what may be termed a "stratified flow" of the liquid between the influent and the effluent end of the chamber 10, which is diagrammatically indicated by the broken lines 45. This tends to eliminate dead or stagnant places in the chamber and secure a more uniform detention period for all portions of the liquid by preventing short circuiting between the inlet and outlet, with the result that the efficiency of the settling chamber will be appreciably increased. It will of course be understood that the hydrostatic head causes the clear liquid to be forced up through the channels 41 and to overflow the weirs 44 into troughs 42, from which it passes by way of troughs 43 and ports 22 to the effluent launder 21.

While in most instances it will be preferable to provide a series of graduated baffles adjacent both the inlet and the outlet to the chamber, in some cases one or the other of said series may be dispensed with. It will also be apparent that the construction is such that it in no wise interferes with the use of the usual sludge removing means, such as 25, 26, nor with a means for removing scum and/or other debris floating on the surface of the liquid, one form of which is indicated at 46.

In the application of the invention illustrated in Figs. 3 and 4, the liquid-solids mixture is fed into the rectangular chamber 50 through ports 51 leading from an influent launder 52, which ports discharge into distributing troughs 53. A series of transverse troughs 54 communicate with and receive the mixture from each of the troughs 53 through ports 55 and upon filling the troughs 54 the mixture overflows therefrom into the vertical channels 56 provided by a series of spaced vertical baffles 57 of graduated lengths, and corresponding to the baffles 30 described above. The flow of course is from each end of the chamber toward its center, where discharge of the clarified liquid is effected through the channels 60 provided by the spaced vertical baffles 61 of graduated lengths, substantially as shown. The liquid rising in the channels 60 overflows into the transverse effluent troughs 62 from which it is received by a collecting trough 63 and discharged through a port 64 in a side wall of the chamber to the effluent launder 65.

Sludge removing mechanism 66 may be provided in the chamber, that here indicated being of a rotary type disclosed in prior U. S. Patent No. 1,947,429 granted February 13, 1934, to Townsend and Brower.

In Figs. 5 and 6 the invention is shown as applied to a circular chamber 70 wherein the feed is through a conduit 71 extending upward through an axially disposed column 72 to distributing troughs 73 which communicate through ports 75 with a series of concentrically arranged troughs 76. A series of baffles 77 is associated with the troughs 76, and comprises a plurality of spaced concentrically arranged tubes of graduated lengths, providing vertical channels 78. Adjacent the peripheral wall of the chamber a second series of spaced concentric baffles 80, of lengths complementing those of the baffles 77, provide vertical channels 81 through which the clarified liquid may rise and overflow into the concentric troughs 82 from which it is received by a collecting trough 83 and discharged through a port 84 to the effluent launder 85. As will be readily understood, in this instance the flow is from the axial portions of the chamber radially outward to its peripheral portions.

It will be obvious that those skilled in the art may vary the details of construction as well as the precise arrangement of parts without departing from the spirit of the invention, and therefore it is not wished to be limited to the above disclosure except as may be required by the claims.

What is claimed is:

1. In apparatus for separating liquids from solids suspended therein, a sedimentation chamber having horizontally spaced influent and effluent portions; means for supplying the liquid-solids mixture to said influent portion; means for discharging liquid from said effluent portion; and a plurality of vertical spaced baffles disposed in said effluent portion and extending downwardly therein to levels which progressively increase throughout its depth in the general direction of flow and provide adjacent vertical channels in said chamber portion for receiving liquid from the chamber at progressively increasing depths, whereby to reduce inequalities in the detention period of various portions of liquid in the chamber by tending to induce a stratified horizontal flow of liquid throughout the depth of the chamber.

2. In apparatus for separating liquids from solids suspended therein, comprising a sedimentation chamber, influent means for supplying the liquid-solids mixture thereto, and effluent means spaced from the influent means for discharging liquid from the chamber: a series of horizontally spaced baffles disposed adjacent said influent means, said baffles extending downwardly in the chamber distances which decrease progressively in the direction of the effluent means, and providing adjacent influent channels adapted to receive the mixture from the influent means and to discharge it at progressively decreasing depths in the chamber; and a second series of horizontally spaced baffles disposed adjacent the effluent means which baffles extend downwardly in the chamber distances which progressively decrease in the direction of the influent means and provide adjacent effluent channels complementary to the respective influent channels and adapted to receive liquid at progressively lower levels in the chamber substantially corresponding to the levels at which the complementary influent channels discharge, whereby a tendency is induced in the liquid to flow in horizontal strata from the influent portion to the effluent portion of the chamber.

3. Apparatus according to claim 2, having means for distributing the mixture from the influent means to each of the influent channels separately.

4. Apparatus according to claim 2, having a launder for receiving the mixture from the influent means, said launder having ports of progressively increasing size through which the mixture is separately supplied to the respective influent channels.

5. In apparatus for separating liquids from solids suspended therein, a sedimentation chamber having horizontally spaced influent and effluent portions; means for supplying the liquid-solids mixture to said influent portion; means for discharging liquid from said effluent portion; means for inducing stratified horizontal flow of the liquid throughout the depth of the chamber whereby to substantially equalize the detention period of all portions of the liquid in the chamber, comprising a plurality of vertical spaced baffles extending downwardly in one of said chamber portions progressively varying distances throughout its depth and providing adjacent vertical liquid channels the lower ends of which open to the chamber at graduated levels throughout its depth; and troughs disposed above the respective baffles, each trough being provided with adjustable weirs whereby flow of liquid through the adjacent channels may be independently controlled.

ARTHUR C. LIND.

REFERENCES CITED

The following references are of record in the file of this patent:

UNITED STATES PATENTS

| Number | Name | Date |
|---|---|---|
| 828,515 | Schmidt | Aug. 14, 1906 |
| 2,118,157 | Camp | May 24, 1938 |
| 1,307,686 | Linden | June 24, 1919 |
| 2,160,838 | Dorr | June 6, 1939 |
| 2,185,785 | Dorr et al. | Jan. 2, 1940 |
| 2,369,194 | Weber | Feb. 13, 1945 |
| 1,057,174 | Schilling | Mar. 25, 1913 |
| 2,373,154 | Welp | Apr. 10, 1945 |

FOREIGN PATENTS

| Number | Country | Date |
|---|---|---|
| 487,155 | France | Mar. 16, 1918 |
| 171,041 | Switzerland | Oct. 16, 1934 |
| 421,266 | Germany | Nov. 12, 1925 |
| 799,602 | France | Apr. 11, 1936 |
| 237,811 | Germany | Sept. 6, 1911 |